United States Patent
Jung et al.

(10) Patent No.: US 10,616,909 B2
(45) Date of Patent: Apr. 7, 2020

(54) D2D OPERATION METHOD PERFORMED BY MEANS OF TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 15/751,613

(22) PCT Filed: Aug. 12, 2016

(86) PCT No.: PCT/KR2016/008905
§ 371 (c)(1),
(2) Date: Feb. 9, 2018

(87) PCT Pub. No.: WO2017/026844
PCT Pub. Date: Feb. 16, 2017

(65) Prior Publication Data
US 2018/0234995 A1 Aug. 16, 2018

Related U.S. Application Data

(60) Provisional application No. 62/203,926, filed on Aug. 12, 2015, provisional application No. 62/204,422, filed on Aug. 12, 2015.

(51) Int. Cl.
*H04W 4/70* (2018.01)
*H04W 72/12* (2009.01)

(52) U.S. Cl.
CPC ... *H04W 72/1242* (2013.01); *H04W 72/1247* (2013.01); *H04W 72/1278* (2013.01); *H04W 4/70* (2018.02)

(58) Field of Classification Search
CPC ....... H04W 4/70; H04W 72/04; H04W 72/10; H04W 72/0406; H04W 72/082;
(Continued)

(56) References Cited

U.S. PATENT DOCUMENTS

2016/0381491 A1* 12/2016 Watfa .................... H04W 72/10
                                                                    455/41.2
2018/0069618 A1*  3/2018 Loehr ................ H04B 7/15542

FOREIGN PATENT DOCUMENTS

| JP | 2015012405 | 1/2015 |
| WO | 2015021185 | 2/2015 |
| WO | 2015115749 | 8/2015 |

OTHER PUBLICATIONS

3GPP TS 36.304 V8.5.0, Mar. 2009.
(Continued)

*Primary Examiner* — Jae Y Lee
*Assistant Examiner* — Aixa A Guadalupe Cruz
(74) *Attorney, Agent, or Firm* — Dentons US LLP

(57) ABSTRACT

The present invention provides a device-to-device (D2D) operation method performed by means of a terminal in a wireless communication system. In the method, uplink transmission and D2D transmission are determined to be contended or not. If the uplink transmission and the D2D transmission are contended, the D2D transmission is determined to be performed or not. And if the D2D transmission is determined to be performed, the D2D transmission is performed. The D2D transmission is determined to be performed or not on the basis of the priority of the uplink transmission and the priority of the D2D transmission.

4 Claims, 16 Drawing Sheets

(58) Field of Classification Search
CPC ... H04W 72/121; H04W 72/14; H04W 72/02;
H04W 72/12; H04W 72/044; H04W
72/1215; H04W 72/1294; H04W 72/0493;
H04W 72/1242; H04W 72/1247; H04W
72/1257; H04W 48/02; H04L 5/0073;
H04L 67/104
See application file for complete search history.

(56) References Cited

OTHER PUBLICATIONS

LG Electronics Inc., "Multiplexing of Uu and D2D Communication," R1-140335, 3GPP TSG RAN WG1 Meeting #76, Prague, Czech Republic, Feb. 1, 2014, see section 2 and figure 1.
NEC, "Discussion on Multiplexing D2D Link and Cellular Link," R1-140491, 3GPP TSG RAN WG1 Meeting #76, Prague, Czeck Republic, Jan. 31, 2014, see section 2.

\* cited by examiner

D2D OPERATION METHOD PERFORMED BY MEANS OF TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2016/008905, filed on Aug. 12, 2016, which claims the benefit of U.S. Provisional Applications No. 62/203,926 filed on Aug. 12, 2015, and No. 62/204,422 filed on Aug. 12, 2015, the contents of which are all hereby incorporated by reference herein in their entirety.

BACKGROUND OF THE INVENTION

Field of the Invention

The present invention relates to wireless communication, and more particularly, to a D2D operation method performed by a user device in a wireless communication system and the user device performing the method.

Related Art

In the International Telecommunication Union Radio Communication sector (ITU-R), standardization of International Mobile Telecommunication (IMT)-Advanced, which is a next generation mobile communication system after 3rd generation, is underway. IMT-Advanced aims to support IP (Internet Protocol) based multimedia service at a data transfer rate of 1 Gbps in a stationary and low-speed moving state, and at a data transfer rate of 100 Mbps in a high-speed moving state.

The 3rd Generation Partnership Project (3GPP) is preparing, as a system standard meeting the requirements of IMT-Advanced, the LTE-Advanced (LTE-A), an improved version of LTE (Long Term Evolution), based on OFDMA (Orthogonal Frequency Division Multiple Access)/SC-FDMA (Single Carrier-Frequency Division Multiple Access) transmission scheme. LTE-A is one of the strong candidates for IMT-Advanced.

Recently, there has been a growing interest in D2D (Device-to-Device) technology in which direct communication is performed between devices. In particular, D2D is attracting attention as a communication technology for public safety networks. Commercial communications networks are rapidly changing to LTE. However, the current public safety network is mainly based on 2G technology, in terms of conflicts with existing communication standards and cost. This technological gap and the need for improved services have led to efforts to improve the public safety network.

Compared to commercial communication networks, public safety networks have high service requirements (reliability and security). In particular, even when the coverage of cellular communication is not available, the public safety network requires direct signaling, or D2D operation, between the devices.

The D2D operation may have various advantages in that the D2D operation refers to transmission and reception of signals between adjacent devices. For example, a D2D device can communicate data at high transmission rates and low latency. In addition, D2D operation may distribute traffic which may otherwise concentrate on the base station.

If the D2D device acts as a relay device, the D2D device can also extend the coverage of the base station.

The relay device must perform uplink transmission and sidelink transmission. If uplink transmission and sidelink transmission are to be performed simultaneously by one relay device, the relay device drops the sidelink transmission. Therefore, even when the relay device is performing a sidelink operation with intending to provide a relay service, the sidelink operation may be interrupted. That is, if the uplink transmission and sidelink transmission occur at the same time, the relay service may be interrupted (or interfered).

In this connection, since the relay operation may be more important than the uplink transmission, dropping the sidelink transmission as described above when the uplink transmission conflicts with the sidelink transmission may not be preferable from the viewpoint of the D2D relay.

Accordingly, according to the present invention, a method for selectively performing the sidelink transmission based on priority when the uplink transmission and the sidelink transmission conflict with each other may be provided. Further, a device for performing the method may be provided.

Further, when the user device performs D2D communication, data (or information) about control and about data general D2D communication among D2D data transmitted from the user device may conflict with each other. In this connection, the PC5-S provides the necessary information to operate the PC5 link, and thus a mechanism must be provided to preferentially provide the PC5-S data rather than other PC5 data.

Therefore, according to the present invention, a method of selectively transmitting PC5-S data based on priority when the PC5-S data transmission and the PC5 data transmission by the user device compete with each other, is provided. Further, a device for performing the method may be provided.

SUMMARY OF THE INVENTION

The present invention provides a D2D operation method performed by a user device in a wireless communication system, and a user device performing the method.

In an aspect, a method for device-to-device (D2D) operation in a wireless communication system is provided. The method may be performed by a user equipment (UE) and may comprise determining whether uplink transmission and D2D transmission compete with each other, determining whether to perform the D2D transmission if the uplink transmission and the D2D transmission compete with each other and performing the D2D transmission if determining to perform the D2D transmission. Whether to perform the D2D transmission may be determined based on a priority of the uplink transmission and a priority of the D2D transmission.

If the priority of the D2D transmission is higher than the priority of the uplink transmission, the D2D transmission may be performed.

If a priority of D2D transmission target data is higher than a logical channel priority of uplink transmission target data, the D2D transmission may be performed.

If Per Packet Priority (PPP) of D2D transmission target data is higher than a logical channel priority of uplink transmission target data, the D2D transmission may be performed.

If a logical channel priority of D2D transmission target data is higher than a logical channel priority of uplink transmission target data, the D2D transmission may be performed.

Performing the D2D transmission may include determining priorities between a plurality of D2D data as D2D transmission target data and performing the D2D transmission based on the determined priorities between the plurality of D2D data. The D2D data having a high priority among the plurality of D2D data may be transmitted.

The D2D data related to control information among the plurality of D2D data may have a higher priority than D2D data not related to the control information among the plurality of D2D data.

Data from a logical channel carrying the D2D data related to the control information among the plurality of D2D data may have a priority higher than data from a logical channel carrying the D2D data not related to the control information among the plurality of D2D data.

A logical channel carrying the D2D data related to the control information may be mapped to a logical channel group (LCG) having a highest priority.

If Per Packet Priority (PPP) is not assigned to the D2D data related to the control information, the UE may assign a specific PPP to the D2D data related to the control information.

When transmission of the D2D data having the high priority is performed, the D2D data having the higher priority may be transmitted using a transmission resource dedicated to transmission of the D2D data having the higher priority.

In another aspect, a user equipment (UE) is provided. The UE may comprise a radio frequency (RF) unit configured for transmitting and receiving a radio signal, and a processor coupled to the RF unit. The processor may determines whether uplink transmission and D2D transmission compete with each other, determines whether to perform the D2D transmission if the uplink transmission and the D2D transmission compete with each other; and performs the D2D transmission if determining to perform the D2D transmission. Whether to perform the D2D transmission may be determined based on a priority of the uplink transmission and a priority of the D2D transmission.

In accordance with the present invention, there is provided a D2D operation method performed by a user device in a wireless communication system, and there is provided a user device performing the method.

According to the present invention, when the uplink transmission and sidelink transmission occur at the same time and the uplink transmission and sidelink transmission are to be performed at the same time, the user device may selectively perform sidelink transmission rather than unconditionally dropping the sidelink transmission and performing the uplink transmission. Accordingly, in the D2D communication environment using the user device according to the present invention, even when uplink transmission and sidelink transmission occur at the same time, relay service may be continuously provided. This ensures the stability of the D2D relay service.

According to the present invention, when the user device performs D2D communication, information about the control of the D2D may be provided prior to the general D2D data. Accordingly, in the D2D communication environment using the user device according to the present invention, the information on the control of the D2D is provided stably, and, thus, the stability of the D2D communication may be guaranteed.

According to the present invention, when the uplink transmission and sidelink transmission occur at the same time and the uplink transmission and sidelink transmission are to be performed at the same time, the user device may selectively perform the sidelink transmission rather than unconditionally dropping the sidelink transmission and performing the uplink transmission. Accordingly, in the D2D communication environment using the user device according to the present invention, even when uplink transmission and sidelink transmission occur at the same time, relay service may be continuously provided. This ensures the stability of the D2D relay service. According to the present invention, when the user device performs D2D communication, information about the control of the D2D may be provided prior to the general D2D data. Accordingly, in the D2D communication environment using the user device according to the present invention, the information on the control of the D2D is provided stably, and, thus, the stability of the D2D communication may be guaranteed.

DESCRIPTION OF EXEMPLARY EMBODIMENTS

Figure 1:
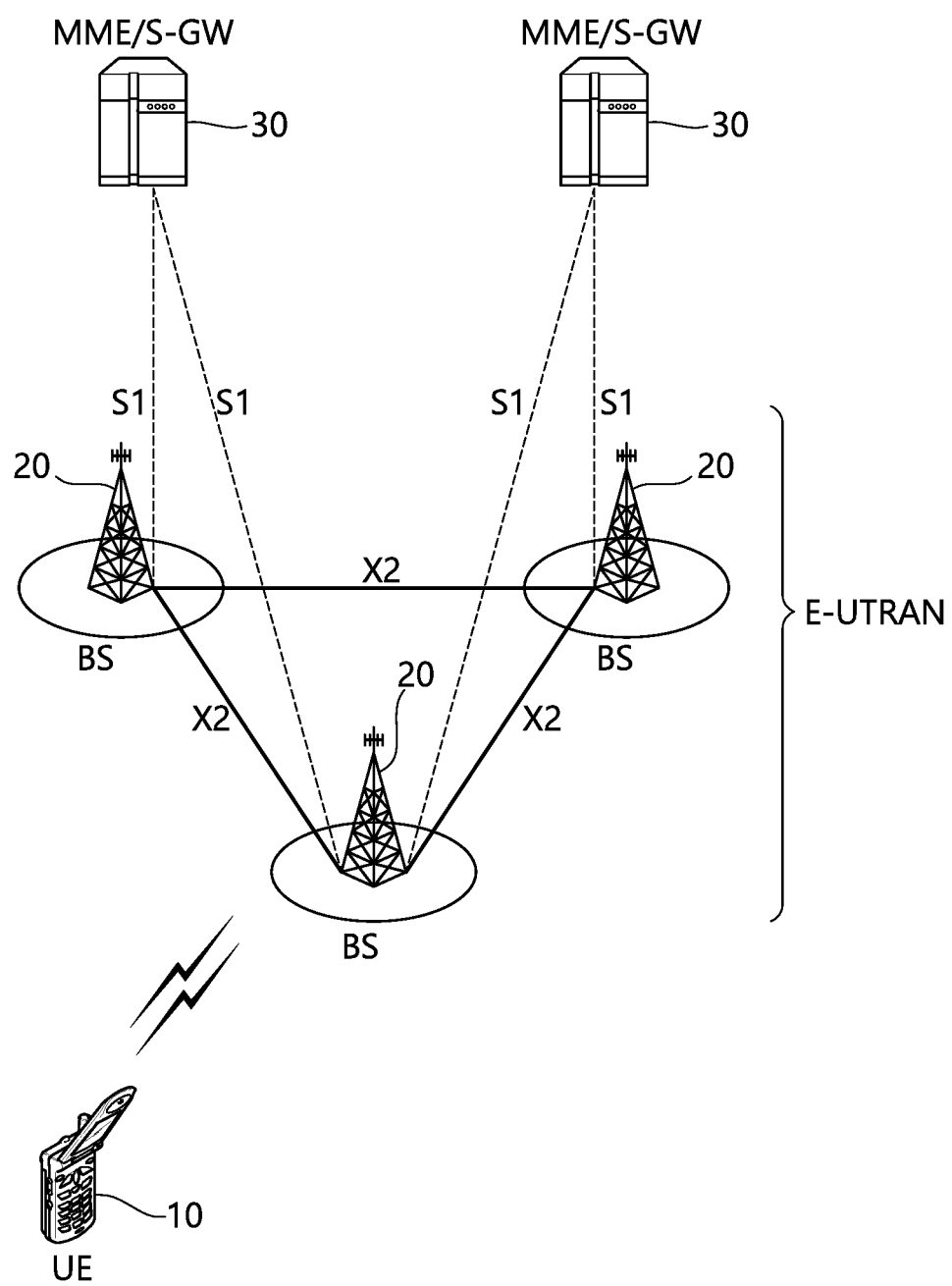
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
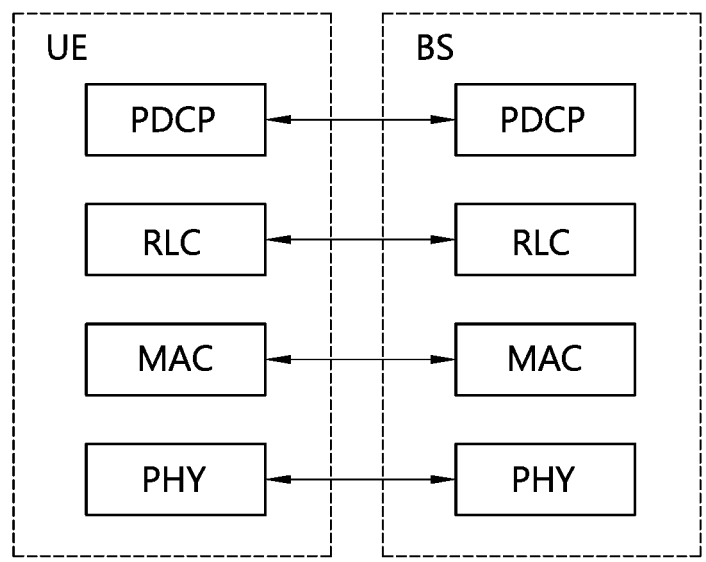
FIG. 2 is a diagram showing a wireless protocol architecture for a user plane.
Figure 3:
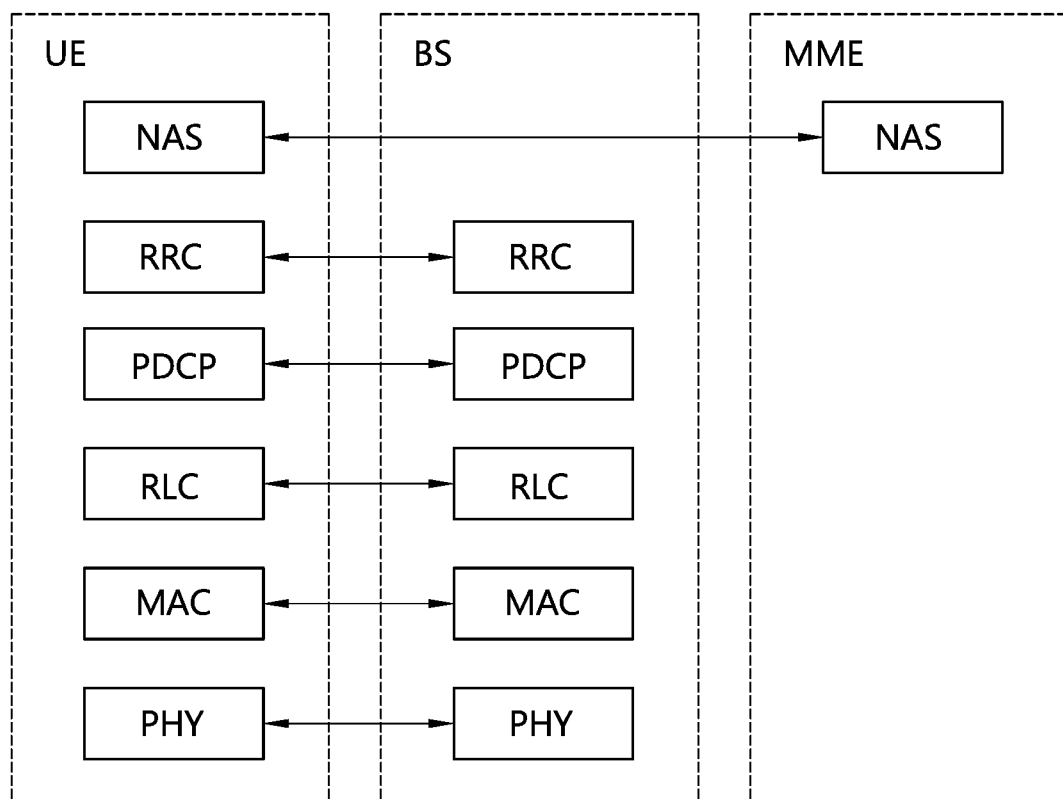
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes 51 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
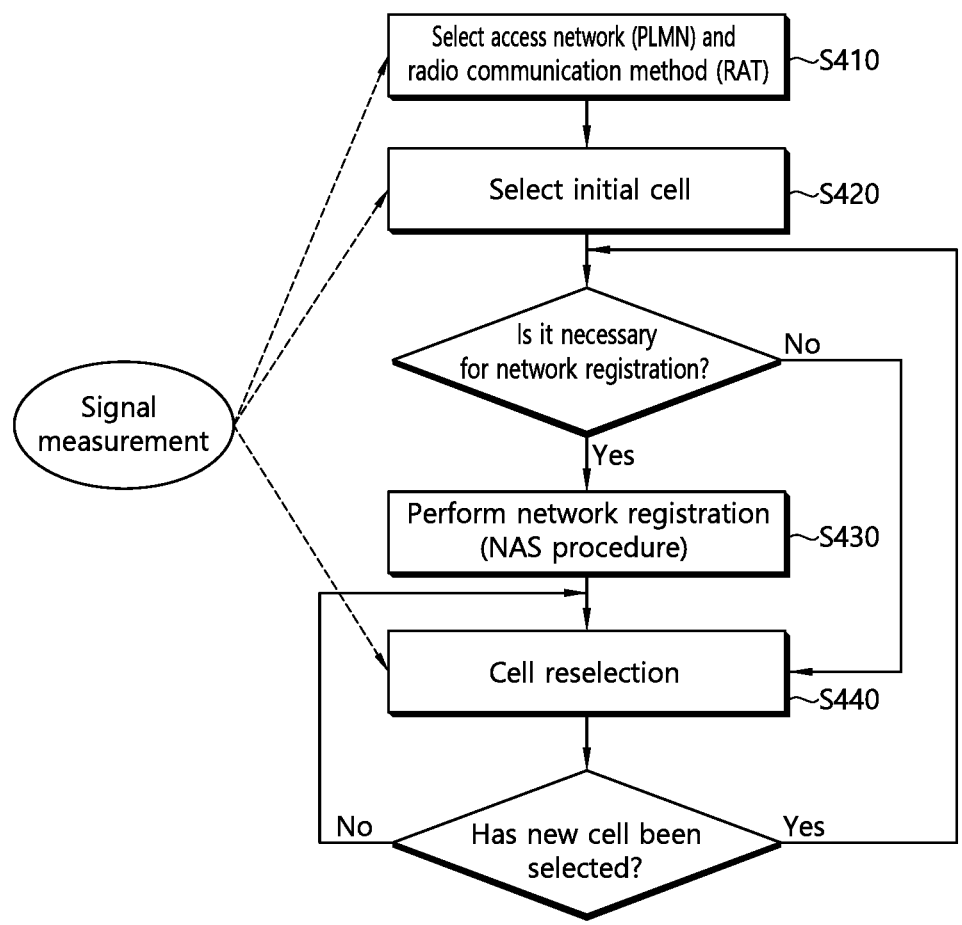
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
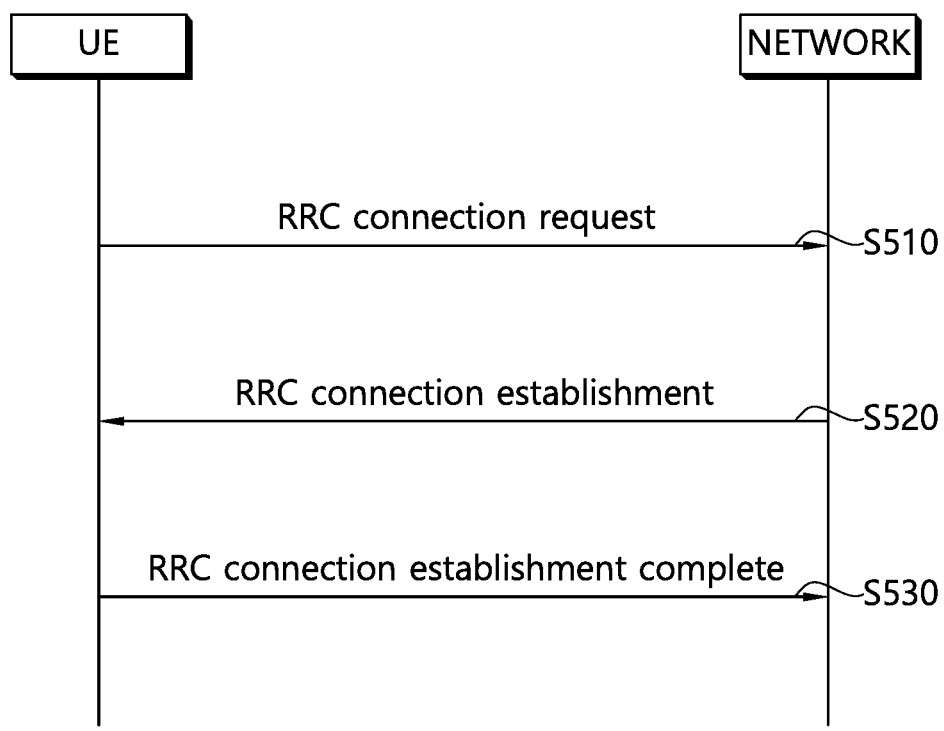
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
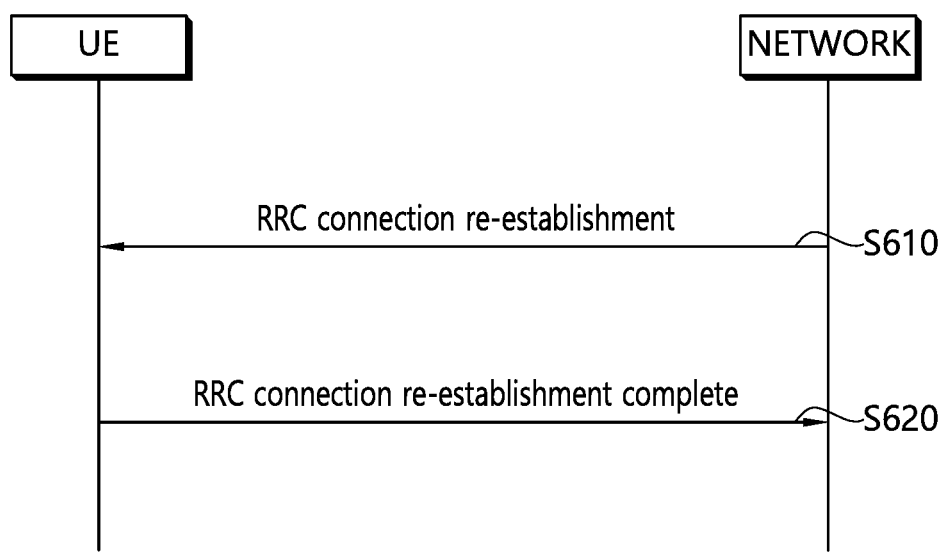
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0.$$

where:
$Srxlev = Q_{rxlevmeas} - (Q_{rxlevmin} + Q_{rxlevminoffset}) - P_{compensation}$
$Squal = Q_{qualmeas} - (Q_{qualmin} + Q_{qualminoffset})$ In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$Rs = Q\text{meas},s + Q\text{hyst}, Rn = Q\text{meas},n - Q\text{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
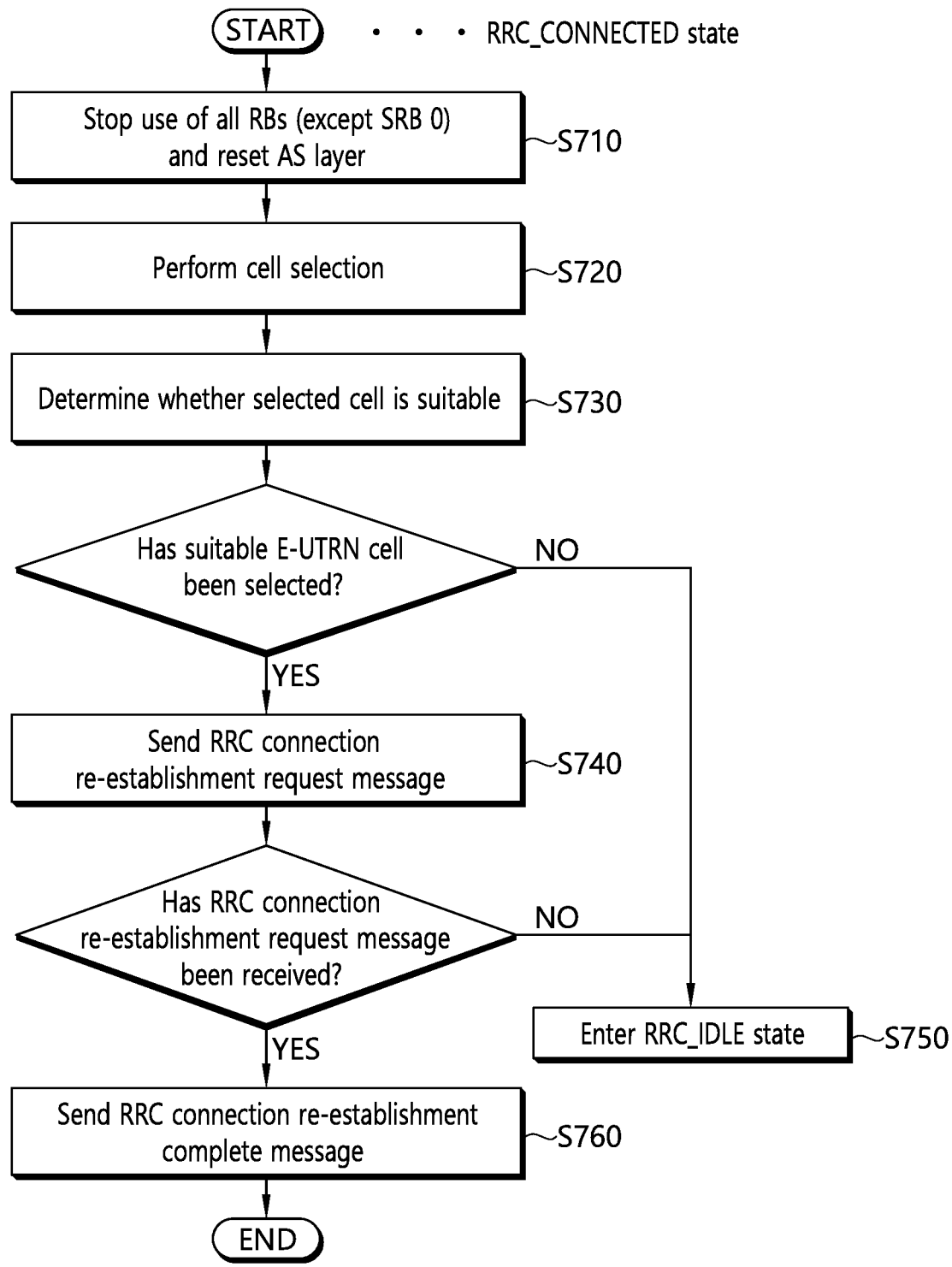
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
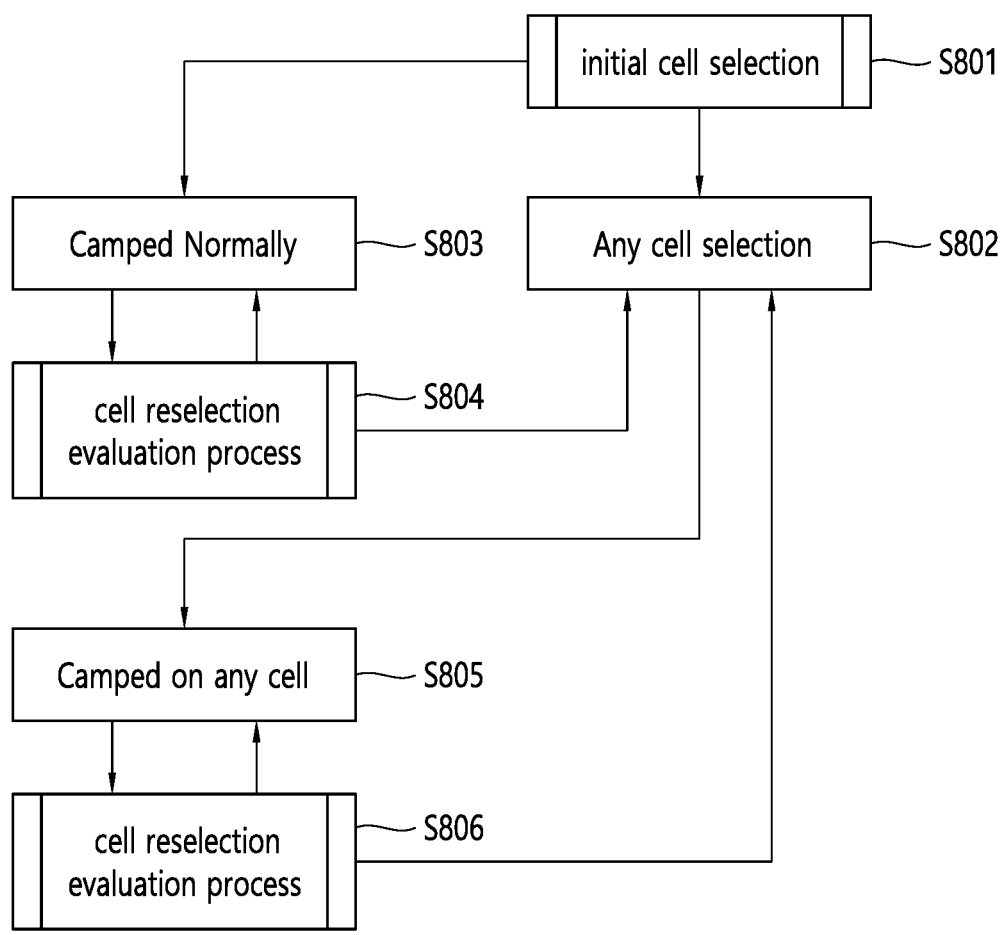
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
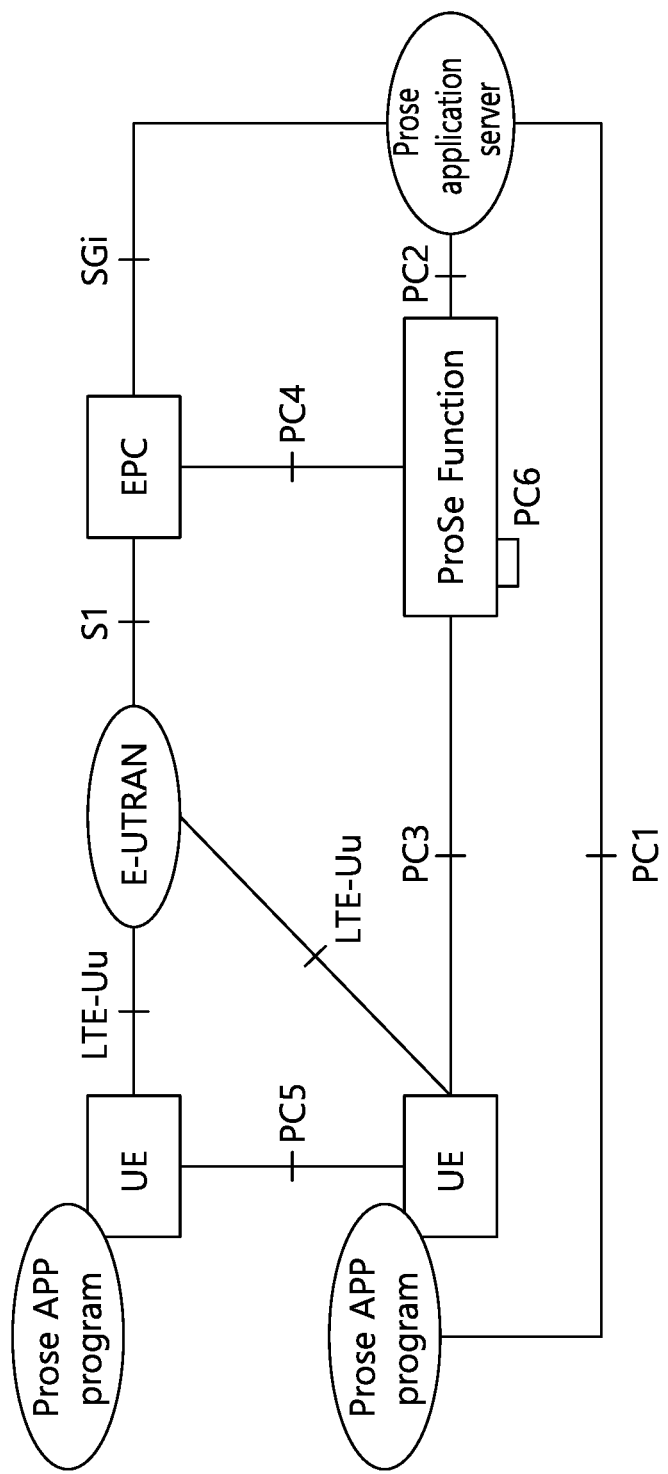
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
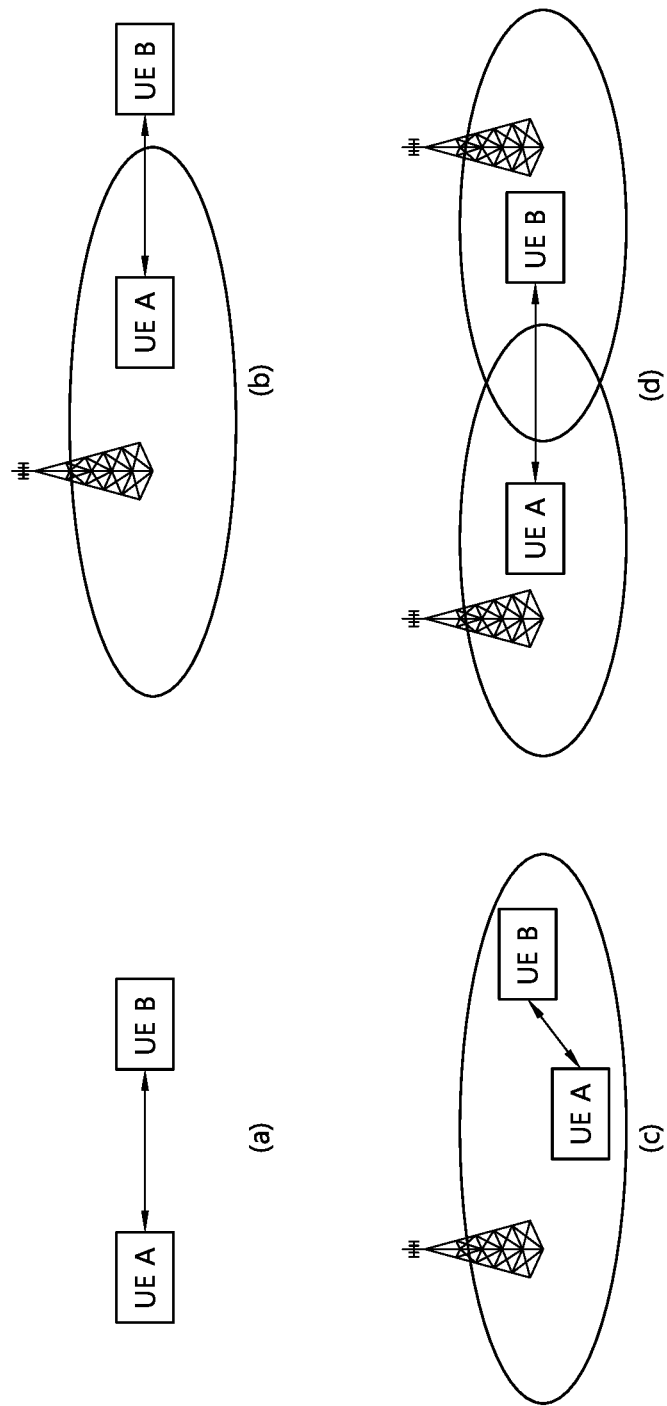
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
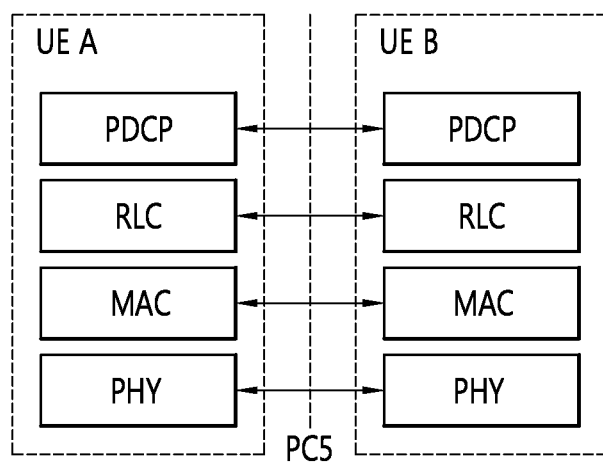
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
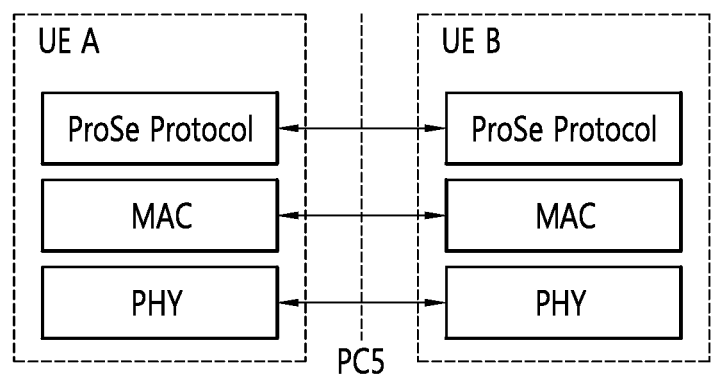
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

The present invention will be described below.

As described above, the user device may provide a relay function between a Uu link (i.e., the link between the user device and the network) and the sidelink. In this connection, the sidelink may refer to the link between the user device and another user device. At this time, the user device which provides the relay function between the Uu link and sidelink may mean the relay device. The relay device provides an extension of network coverage, for example, for out of coverage (that is, region outside the network coverage) and/or bad network-in coverage (that is, region in the network coverage, but with poor network quality).

The relay device must perform the uplink transmission and sidelink transmission. If the uplink transmission and sidelink transmission are to be performed simultaneously in one relay device (In other words, if the relay device attempts to perform the uplink transmission, and the time to perform the uplink transmission and the time to perform the sidelink transmission are the same (or partially overlapped) or if the relay device tries to perform the sidelink transmission, and the time to perform the uplink transmission and the time to perform the sidelink transmission are the same (or partially overlapped), the relay device drops the sidelink transmission as long as the relay device does not have the capability to transmit all of the uplink transmission and sidelink transmission. Therefore, even when the relay device is performing the sidelink operation with intending to perform the relay service, the sidelink operation may be interrupted. That is, if the uplink transmission and the sidelink transmission occur at the same time, the relay service may be interrupted (or stopped).

In this connection, since the relay operation may be more important than the uplink transmission, dropping the sidelink transmission as described above when the uplink transmission conflicts with the sidelink transmission may not be preferable from the viewpoint of the D2D relay.

Accordingly, according to the present invention, a method for selectively performing the sidelink transmission based on priority when the uplink transmission and the sidelink transmission conflict with each other may be provided. Further, a device for performing the method may be provided. Hereinafter, the sidelink may refer to a link between the user device and another user device. Further, the sidelink may refer to a link between the user devices providing D2D communication. Hereinafter, for convenience of explanation, the sidelink may be exchangeable with a 'PC5 link'. The communication based on the sidelink may be exchangeable with the D2D communication.

Further, when the user device performs D2D communication, data (or information) about control and about data general D2D communication among D2D data transmitted from the user device may conflict with each other. In this connection, control data may refer to PC5-S data. The PC5-S may provide control message signaling (for example, NA signaling between the user devices) between the user devices via a PC5 interface (e.g., establishing a relay link between a remote user device and the relay device providing the relay between the user device and the network). In this connection, the PC5-S provides the necessary information to operate the PC5 link, and thus a mechanism must be provided to preferentially provide the PC5-S data rather than other PC5 data.

Thus, according to the present invention, there are provided a device and a method for determining priority between contending data and determining data to be transmitted or transmitted according to the determined priority when a D2D transmission competes with an uplink transmission or another D2D transmission.

First, an example of a method by which the user device performs the sidelink transmission based on priority is described when the uplink transmission is collided with the sidelink transmission. Specifically, the method according to the present invention, as described below, may allow the device to select the uplink transmission or sidelink transmission, based on the criterion of the priorities of the data that are potentially to be transmitted respectively via the uplink and sidelink. When the sidelink is selected as a result of the above link selection, the user device may transmit corresponding data via the selected link (here, sidelink). Hereinafter, the present embodiment will be described more specifically with reference to the drawings.

Figure 13:
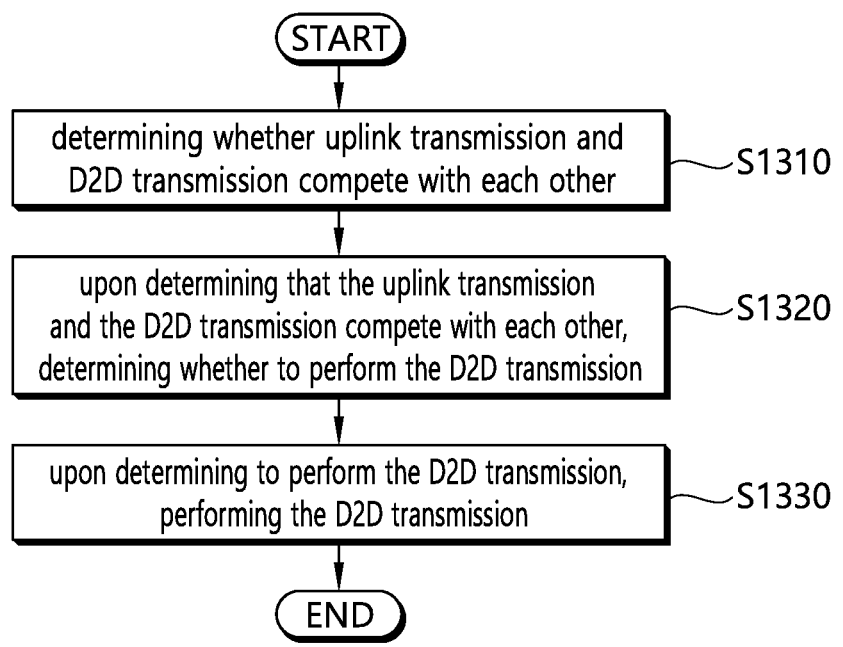
FIG. 13 is a flowchart of a method for performing the sidelink transmission when the uplink transmission and sidelink transmission are collided, according to one embodiment of the present invention.

FIG. 13 is a flowchart of a method for performing the sidelink transmission when the uplink transmission and sidelink transmission are collided, according to one embodiment of the present invention.

Referring to FIG. 13, the user device determines whether the uplink transmission and D2D transmission compete with each other (S1310). In this connection, the user device may refer to a relay device that provides a relay function between the Uu link and sidelink. The sidelink means a link for D2D communication. That is, the sidelink may refer to the link between user devices. Hereinafter, for convenience of explanation, the sidelink communication and D2D communication may be used interchangeably. In this connection, the sidelink communication may mean the D2D communication. In addition, the sidelink transmission may be used interchangeably with the D2D transmission. In this connection, the sidelink transmission may mean D2D transmission The fact that the uplink transmission and the D2D transmission are contended with each other may mean that D2D transmission may be potentially performed at the time of the uplink transmission. Alternatively, the uplink transmission and the D2D transmission may be contended with each other, which means that the D2D transmission is set at the time when the uplink transmission is performed. Alternatively, the uplink transmission and the D2D transmission may be contended with each other, which may mean that uplink transmission may potentially be made at the time of the D2D transmission. Alternatively, the uplink transmission and the D2D transmission may be contended with each other, which may mean that the uplink transmission is potentially established at the time the D2D transmission is made.

In one example, the user device may consider setting the selected sidelink grant as a sidelink grant for the timing of a subsequent sidelink transmission (e.g. T_SL_TX). When the user device receives an uplink grant for uplink transmission on the same timing (that is, T_SL_TX) as the sidelink transmission timing as described above, the user device may determine that the uplink transmission and the D2D transmission are contended with each other.

When the uplink transmission and the D2D transmission conflict with each other, the user device may determine whether the criterion for performing the D2D transmission is satisfied (S1320). That is, the user device may determine whether to perform the D2D transmission when the uplink transmission and the D2D transmission compete with each other. In other words, when the priority of the D2D transmission is higher than the priority of the uplink transmission, the user device may decide to perform the D2D transmission.

In one example, the user device may consider setting the selected sidelink grant as a sidelink grant for the timing of a subsequent sidelink transmission (e.g. T_SL_TX). If the user device receives an uplink grant for the uplink transmission on the same timing (that is, T_SL_TX) as the sidelink transmission timing as described above, the user device may determine whether the condition to perform the sidelink transmission rather than the uplink transmission is satisfied. In this regard, the criterion may be defined as follows.

For example, when the sidelink transmission and the uplink transmission compete with each other, the user device compares the priority of the sidelink transmission with the priority of the uplink transmission. If the priority of the sidelink transmission is higher than the priority of the uplink transmission, the user device may perform sidelink transmission.

Alternatively, for example, when the sidelink transmission and uplink transmission compete with each other, the user device compares the priority of the sidelink transmission with the priority of the uplink transmission. If the priority of the sidelink transmission is equal to or higher than the priority of the uplink transmission, the user device may also perform sidelink transmission.

More specifically, when the uplink transmission and the D2D transmission compete with each other, before the criterion for performing a D2D transmission by the user device is described, the following may be explained first.

Data (transport block) to be transmitted potentially via the sidelink (SL-SCH) may be represented as data_SL.

Potentially transmitted data (transport block) via the uplink (e.g. UL-SCH) may be represented as data_UL.

It is assumed that the uplink is scheduled for the user device at the same time as the user device attempts to perform the SL-SCH transmission via the granted grant.

Hereinafter, a condition (or criterion) for performing the D2D transmission by the user device when the uplink transmission and the D2D transmission compete with each other will be described in more detail.

1) condition (or, criterion) 1 (comparing the logical channel priority of UL data with the priority of sidelink data)

A. Each PPP (Per Packet Priority) value is mapped to a specific priority value. This mapping may be performed via the eNB configuration. In this connection, the eNB configuration may refer to configuration (for example, RRC reconfiguration) of the upper layer (for example, RRC layer).

B. The user device may configure or consider such that the priority of the data (for example, data_SL) that is potentially transmitted via the sidelink has the assigned priority value as described above. That is, the user device may configure the priority of the data to be transmitted via the sidelink based on the PPP.

C. The user device may compare the logical channel priority of data (for example, data_UL) to be transmitted via the uplink with the priority of data (for example, data_SL) to be transmitted via the sidelink. That is, the user device may compare the priority of the uplink data with the priority of the sidelink data. In other words, the user device may compare the priorities between the uplink data and sidelink data. D-1. If the priority of the sidelink data (for example, data_SL) is higher than the logical channel priority of data (for example, data_UL), the user device may determine that the condition (criterion) is satisfied. That is, if the priority of the sidelink transmission is higher than the priority of the uplink transmission, the user device may determine that the condition (criterion) is satisfied.

D-2. If the priority of the sidelink data (for example, data_SL) is equal to or higher than the logical channel priority of data (for example, data_UL), the user device may determine that the condition (criterion) is satisfied. That is, if the priority of the sidelink transmission (for example, data_SL) is equal to or higher than the priority of the uplink transmission (for example, data_UL), the user device may determine that the condition (criterion) is satisfied.

In summary, when the priority of the D2D transmission target data is higher (or equal to) than the logical channel priority of the uplink transmission target data, the device may decide to perform D2D transmission.

2) Condition (or, criterion) 2 (comparing the logical channel priority of UL data with PPP of the sidelink data)

A. The priority of the uplink logical channel is mapped to a specific PPP. This mapping can be performed via the eNB configuration. In this connection, the eNB configuration may mean a configuration (for example, RRC reconfiguration) of an upper layer (for example, RRC layer).

B. The user device may compare the logical channel priority of the data (for example, data_UL) to be transmitted via the uplink with the PPP of the sidelink data (for example, data_SL).

C-1. If the PPP of the sidelink data (for example, data_SL) is higher than the logical channel priority of the data (for example, data_UL), the user device may determine that the condition (criterion) is satisfied.

C-2. If the PPP of the sidelink data (for example, data_SL) is equal to or higher than the logical channel priority of the data (for example, data_UL), the user device may determine that the condition (criterion) is satisfied.

In summary, if the Per Packet Priority (PPP) of the D2D transmission target data is higher than (or equal to) the logical channel priority of the uplink transmission target data, the device may decide to perform the D2D transmission.

3) Condition (or criterion) 3 (comparing the logical channel priority of UL data with logical channel priority of the sidelink data)

A. The priority of each logical channel of the sidelink channel of the user device is given. The priority of each logical channel may be a PPP value or a function of the PPP.

B. The user device may compare the logical channel priority of the data (for example, data_UL) to be transmitted via the uplink with the logical channel priority of the sidelink data (for example, data_SL).

C-1. If the logical channel priority of the sidelink data (for example, data_SL) is higher than the logical channel priority of the data (for example, data_UL), the user device may determine that the condition (or criterion) is satisfied.

C-2. If the logical channel priority of the sidelink data (for example, data_SL) is equal to or higher than the logical channel priority of the data (for example, data_UL), the user device may determine that the condition (or criterion) is satisfied.

In summary, if the logical channel priority of the D2D transmission target data is higher than or equal to the logical channel priority of the uplink transmission target data, the device may decide to perform the D2D transmission.

When evaluating the above conditions, the user device may consider the radio capabilities of the user device. If the user device has the capabilities to simultaneously perform the sidelink transmission and the uplink transmission of interest, the user device may determine that the condition (or criterion) as described above is not satisfied. That is, if the user device has the capabilities to simultaneously perform the sidelink transmission and the uplink transmission, the user device does not drop the sidelink transmission or the uplink transmission, but the device may simultaneously perform both the sidelink transmission and the uplink transmission.

4) Condition (or, criterion) 4 (determining the priority based on the type of D2D interface over which the sidelink data is transmitted)

A. the device may determine whether the data to be transmitted via D2D is D2D data (D2D link control message) transmitted over the PC5-S interface or other data transmitted over the PC5 interface.

B. If the data to be transmitted via D2D is the data transmitted on the PC5-S interface, the user device may determine that the corresponding data has a higher priority than the uplink data and thereby determine that the condition is satisfied.

Thereafter, when the above condition is satisfied, the user device may perform the D2D transmission (S1330).

In one example, the user device may consider configuring the selected sidelink grant as a sidelink grant for the timing (for example, T_SL_TX) of the subsequent sidelink transmission. If the user device receives an uplink grant for the uplink transmission on the same timing (that is, T_SL_TX) as the sidelink transmission timing described above, the user device may determine whether a condition (or criterion) for performing the sidelink transmission other than the uplink transmission is satisfied, as described above. If the above condition is satisfied, the user device may not perform the uplink transmission on the above timing (that is, T_SL_TX), and may perform the sidelink transmission on the above timing (that is, T_SL_TX).

In the description of the present invention, the method described above may also be applied when the uplink transmission and the sidelink reception occur at the same time. That is, in the above method, the sidelink transmission may be replaced by the reception of the sidelink.

Hereinafter, an example of a method by which the user device transmits selectively PC5-S data based on priority when the PC5-S data transmission or the PC5 data transmission conflict with each other, will be illustrated. In this connection, as described above, PC5-S data may mean D2D control data, and PC5-S data may be used interchangeably with D2D control data. Further, PC5 data may refer to general D2D data excluding D2D control data, and PC5 data may be used interchangeably with general D2D data except for D2D control data. That is, an embodiment as described below may be a method by which the user device transmits D2D control data based on priority when the D2D control data transmission and the general D2D data transmission conflict with each other. In other words, the embodiment provided below may be a method of performing D2D control transmission based on priority by the user device when D2D control transmission or general D2D transmission conflict with each other. Hereinafter, the embodiment of the present invention will be described in more detail with reference to the drawings.

Figure 14:
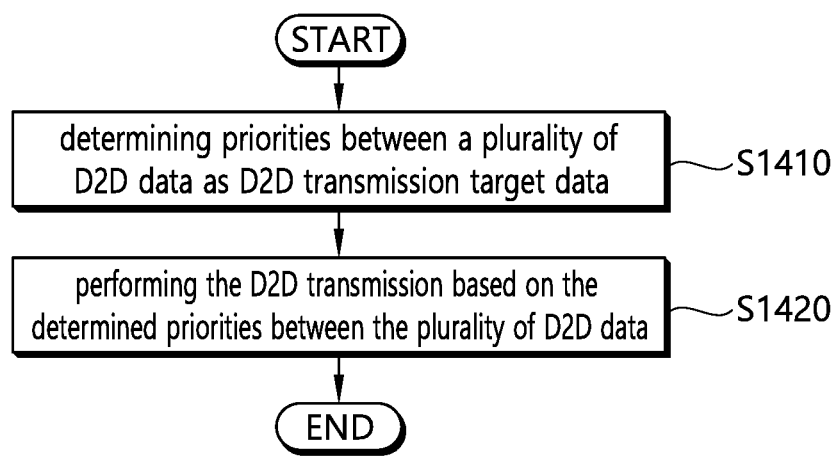
FIG. 14 is a flow diagram of the D2D transmission method based on priority according to one embodiment of the present invention.

FIG. 14 is a flow diagram of the D2D transmission method based on priority according to one embodiment of the present invention.

Referring to FIG. 14, the user device may determine the priority of the D2D transmission (S1410). That is, the user device may determine priorities between a plurality of D2D data subjected to the D2D transmission.

To determine the priority of the D2D transmission, the user device may do the following: 1) The device assigns logical channel prioritization to PC5-S data having a logical channel priority higher than other data using the sidelink; 2) The device assigns a specific higher priority to the logical channel group (LCG) mapped to the logical channel on which the PC5-S data is transmitted than that of other logical channels for the sidelink; and 3) the device may apply a prioritization method, such as selection of resources reserved for transmission with high priority. The details of the above-described prioritization will be described later. In addition, in this connection, the user device may refer to a D2D device and/or a D2D remote user device. In this connection, the D2D remote user device may refer to a D2D device that communicates with the base station via a relay device.

In applying prioritization, the user device may transmit data to at least one ProSe destination. In this connection, ProSe destination may refer to ProSe group.

Per packet priority (PPP) may be defined independently for each of the data received from the NAS layer of the user device by the A) layer of the user device. In this connection, data with different PPPs may be transmitted to one ProSe destination. In addition, the PPP may refer to a ProSe per packet priority (PPPP): 1) data may mean PDCP SDU; and 2) PPP may be provided by the upper layer when the user device receives a packet from the upper layer.

The radio bearer may be configured on each ProSe destination and each PPP basis.
LCG may be defined on each ProSe destination basis. In this connection, the sidelink logical channel for ProSe destination may be mapped to one of the LCGs defined for ProSe destinations based on PPP.

All of the above may be assumed for prioritization.

To determine the priority of the D2D transmission, the user device may do the following: 1) The device assigns logical channel prioritization to PC5-S data having a logical channel priority higher than other data using the sidelink; 2) The device assigns a specific higher priority to the logical channel group (LCG) mapped to the logical channel on which the PC5-S data is transmitted than that of other logical channels for the sidelink; and 3) the device may apply a prioritization method, such as selection of resources reserved for transmission with high priority.

1) Logical Channel Prioritization

For logical channel prioritization procedures for sidelink, the MAC entity may consider the relative priority between the following data in descending order.

Data from the logical channel carrying the PC5-S data
Data from any logical channel carrying data except PC5-S data In summary, the MAC entity assigns the highest priority to the data from the logical channel carrying the PC5-S data and then the next higher priority to the data from the logical channel that carries the data except for the PC5-S data. In other words, the MAC entity may set PC5-S data to have the highest priority and PC5 data other than PC5-S data to have the next highest priority. In other words, the MAC entity may consider the D2D control data as the highest priority data and consider the D2D general data (that is, D2D data other than the D2D control data) as the next priority data.

That is, even when PPP is not configured for or assigned to each data (for example, PC5-S data and/or PC5 data, etc.), the user device may determine the priority for each data based on the above-described priority.

2) Logical Channel Group (LCG) Priority

The sidelink logical channel carrying the PC5-S data may be mapped to a specific logical channel group along with a specific priority. In this connection, the logical channel carrying the PC5-S data may be mapped to the LCG along with the highest priority (for example, priority set to '00').

In summary, even though PPP is not configured for or assigned to data (PC5 or PC5-S data), the user device may determine the priority for the data (PC5 or PC5-S data) based on the LCG. In this connection, the user device assigns the logical channel carrying PC5-S data not having the PPP configured thereto to the LCG with the highest priority and then may transmit the PC5-S data with the highest priority.

3) Resource Selection

A. a set of transmission resources that are allowed to be used for data with a specific priority higher than the threshold may be configured for the user device. The threshold may be configured by the network or pre-configured. If PPP is indicated for the data to be sent, the PPP may be used as a priority to be used for selecting a resource to be applied.

In summary, the set of transmission resources that are allowed to be used for transmission of data with a priority higher than the threshold may be configured for the user device (in this connection, the set of transmission resources may refer to a group of transmission resources that are allowed to be used for transmission of data with a priority higher than the threshold). Further, the PPP is indicated for (or is allocated to) the data, thereby indicating the priority for the data. If the priority is higher than the threshold, the user device may transmit the data using a transmission resource that may be used to transmit the data having the higher priority.

In one example, a first transmission resource set that is allowed to be used to transmit data with a priority higher than (or equal to) the threshold, and a second set of transmission resources that is allowed to be used to transmit data with a priority equal to or lower than the threshold may be configured. If the priority assigned to the data to be transmitted is higher or equal to than the threshold, the user device may transmit the data using the first transmission resource set. If the priority assigned to the data to be transmitted is lower or equal to than the threshold, the user device may transmit the data via the second transmission resource set.

B. A set of transmission resources that are allowed to be used for data with a specific priority may be configured for the user device.

C. A set of transmission resources that are allowed to be used for specific data corresponding to a specific type of PDCP SDU may be configured for the user device.

In this connection, the above transmission resource set may also mean a resource pool. When selecting the transmission resource, regarding the selection of the resource pool, the user device may also select a transmission pool that may be used to transmit data.

As for the application of the above-mentioned priority, the followings may be additionally applied.

For PC5-S data, if PPP is indicated for (or assigned to) each PC5-S data via the upper layer, the user device may select a transmission resource by applying the resource selection based on A. or B. above.

In one example, PPP is assigned to PC5-S data, and, thus, priority is assigned to PC5-S data. If the priority is higher than the threshold, the user device may transmit the data having a high priority using a transmission resource used for transmitting the data having a high priority. In this connection, the details are as described above.

In one example, PPP may be assigned to PC5-S data and thus priority may be assigned to PC5-S data. The user device may perform the data having the priority transmission based on a transmission resource set allowed to be used to transmit the data having the priority.

For PC5-S data, if PPP is not indicated for (or assigned to) each PC5-S data via the upper layer, the user device may assign a specific PPP to the data. The user device may select a transmission resource by applying A. or B. as a resource selection process as described above. In this connection, the value of PPP to be allocated to PC5-S data may be configured by the network.

In one example, if PPP is not assigned to PC5-S data, the user device assigns a priority to the PC5-S data. If the assigned priority is higher than the threshold, the user device may transmit the higher priority data using a transmission resource that may be used to transmit the data having a higher priority. In this connection, the details are as described above.

In one example, if PPP is not assigned to PC5-S data, the user device assigns priority to the PC5-S data. The user device may perform transmission of the data having the priority using a transmission resource set allowed to be used to transmit the data having the priority.

Alternatively, for PC5-S data, if the PPP is not indicated for each PC5-S data via the upper layer, and the transmission resource is reserved for a specific type of PDCP PDU, the user device may select a transmission resource (that is, C. as described above may be applied).

In one example, the user device may configure a set of transmission resources that are allowed to be used to transmit the specific data corresponding to the specific type of PDCU SDU.

Details (1), (2), (3)) regarding the configuration of the priorities as above-mentioned may mean that the user device may specify a specific PPP value for the data on the sidelink logical channel. Further, the above details may mean that the user device may specify a specific PPP value for data (PC5-S data or PC5 data, etc.) not having the PPP configured thereto. Further, the above details may mean that the AS layer may specify an arbitrary PPP value for data for which PPP is not specified.

Thereafter, the user device may perform D2D transmission based on the determined priority (S1420). That is, the user device may perform transmission of D2D data having a higher priority among the plurality of D2D data. According to the priority application method, the user device may preferentially transmit D2D control information based on the above-described priority. In other words, the user device may preferentially transmit data related to the PC5-S based on the above-described priority.

One example of a method by which the user device transmits selectively the PC5-S data based on the priority when PC5-S data transmission and PC5 data transmission conflict each other may be performed independently or in combination with one example of a method by which the user device performs the sidelink transmission based on the priority when the uplink transmission and the sidelink transmission compete with each other.

Hereinafter, a situation where one example of a method by which the user device transmits selectively the PC5-S data based on the priority when PC5-S data transmission and PC5 data transmission conflict each other may be performed in combination with one example of a method by which the user device performs the sidelink transmission based on the priority when the uplink transmission and the sidelink transmission compete with each other will be described with reference to the drawings.

Figure 15:
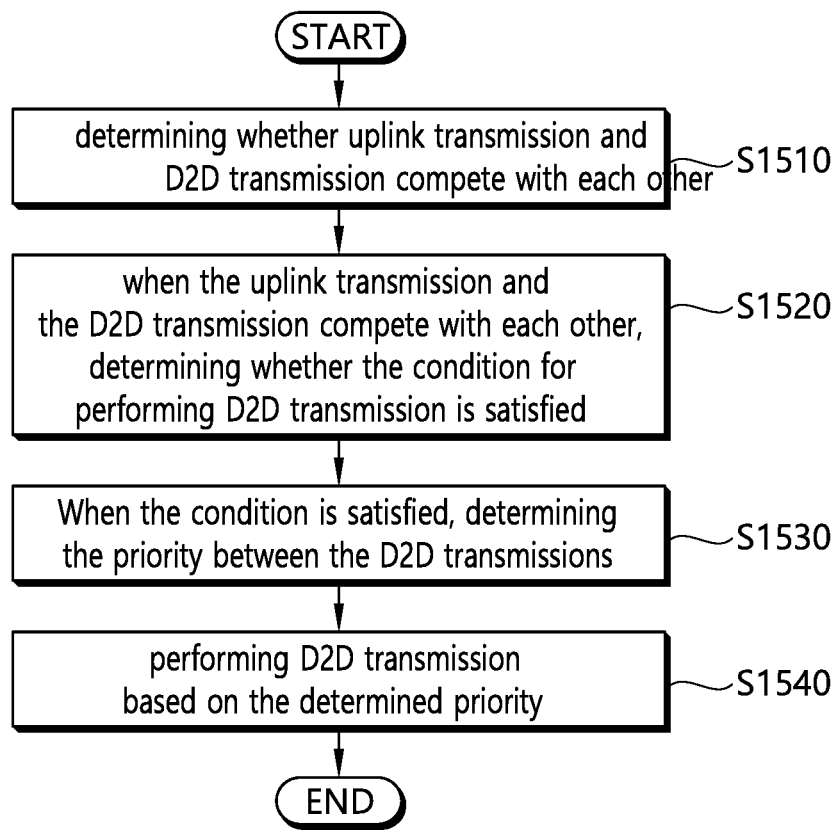
FIG. 15 is a flow diagram of the D2D transmission method according to one embodiment of the present invention.

FIG. 15 is a flow diagram of the D2D transmission method according to one embodiment of the present invention.

The user device may determine whether the uplink transmission and the D2D transmission conflict with each other (S1510). In this connection, a concrete example of determining, by the user device, whether the uplink transmission and the D2D transmission conflict with each other is as described above.

If the uplink transmission and the D2D transmission compete with each other, the user device may determine whether the condition for performing D2D transmission is satisfied (S1520). In this connection, a specific example of the user device determining whether the condition for performing D2D transmission is satisfied when the uplink transmission and the D2D transmission compete with each other is as described above.

If the condition is satisfied, the user device may determine the priority between the D2D transmissions (1530). In this connection, a concrete example in which the user device determines the priority among the D2D transmissions when the above condition is satisfied is as described above.

The user device may perform D2D transmission based on the determined priority (S1540). In this connection, a concrete example of performing D2D transmission based on the determined priority by the user device is as described above.

Figure 16:
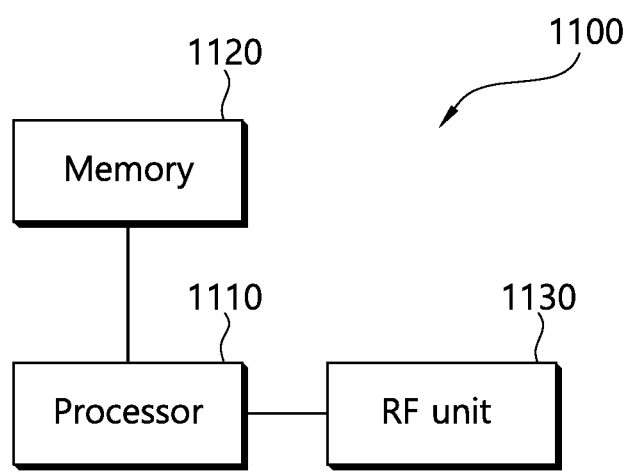
FIG. 16 is a block diagram illustrating the user device in which the embodiment of the present invention is implemented.

FIG. 16 is a block diagram illustrating the user device in which the embodiment of the present invention is implemented.

Referring to FIG. 16, the user device 1100 includes a processor 1110, a memory 1120, and a radio frequency unit 1130. The processor 1110 may determine whether the uplink transmission and the D2D transmission compete with each other. Further, when the uplink transmission and the D2D transmission compete with each other, the processor 1110 may determine whether the condition for performing the D2D transmission is satisfied. Further, when the above condition is satisfied, the processor 1110 may perform the D2D transmission.

The RF unit 1130 is connected to the processor 1110 to transmit and receive radio signals.

The processor may comprise an application-specific integrated circuit (ASIC), other chipset, logic circuitry and/or a data processing device. The memory may include read-only memory (ROM), random access memory (RAM), flash memory, memory card, storage media and/or other storage devices. The RF unit may include a baseband circuit for processing the radio signal. When the embodiment is implemented in software, the above-described techniques may be implemented with modules (processes, functions, etc.) that perform the functions described above. The module may be stored in memory and executed by the processor. The memory may be internal or external to the processor, and may be coupled to the processor by any of a variety of well known means.

What is claimed is:

1. A method for performing a device-to-device (D2D) operation in a wireless communication system, the method performed by a user equipment (UE) and comprising:
   determining whether to perform the D2D operation when an uplink transmission and the D2D operation compete with each other based on a priority of the uplink transmission and a priority of the D2D operation; and performing the D2D operation when the priority of the D2D operation is higher than the priority of the uplink transmission, wherein the D2D operation includes a transmission of first D2D data and a transmission of second D2D data, wherein, when a priority of the first D2D data is the same or higher than threshold information, the UE performs the transmission of the first D2D data based on a first resource group for a high priority data transmission, when a priority of the second D2D data is lower than the threshold information, the UE performs the transmission of the second D2D data based on a second resource group for a non-high priority data transmission, and wherein the threshold information is received from a network.

2. The method of claim 1, wherein the priority of the D2D operation is identified based on a Per Packet Priority (PPP).

3. A user equipment (UE) comprising:
a transceiver configured for transmitting and receiving a radio signal; and
a processor coupled to the transceiver, the processor is configured to:
determine whether to perform a device-to-device (D2D) operation when an uplink transmission and the D2D operation compete with each other based on a priority of the uplink transmission and a priority of the D2D operation; and perform the D2D operation when the priority of the D2D operation is higher than the priority of the uplink transmission, wherein the D2D operation includes a transmission of first D2D data and transmission of a second D2D data, wherein, when a priority of the first D2D data is the same or higher than threshold information, the UE performs the transmission of the first D2D data based on a first resource group for a high priority data transmission, when a priority of the second D2D data is lower than the threshold information, the UE performs the transmission of the second D2D data based on a second resource group for a non-high priority data transmission, and wherein the threshold information is received from a network.

4. The UE of claim 3, wherein the priority of the D2D operation is identified based on a Per Packet Priority (PPP).

* * * * *